March 25, 1930. S. CEGLOWSKI 1,752,148
AUTOMOBILE HEATING APPARATUS
Filed May 2, 1929 2 Sheets-Sheet 1

INVENTOR.
S. CEGLOWSKI
BY E. E. Vrooman & Co.
Their ATTORNEYS.

March 25, 1930.  S. CEGLOWSKI  1,752,148
AUTOMOBILE HEATING APPARATUS
Filed May 2, 1929    2 Sheets-Sheet 2
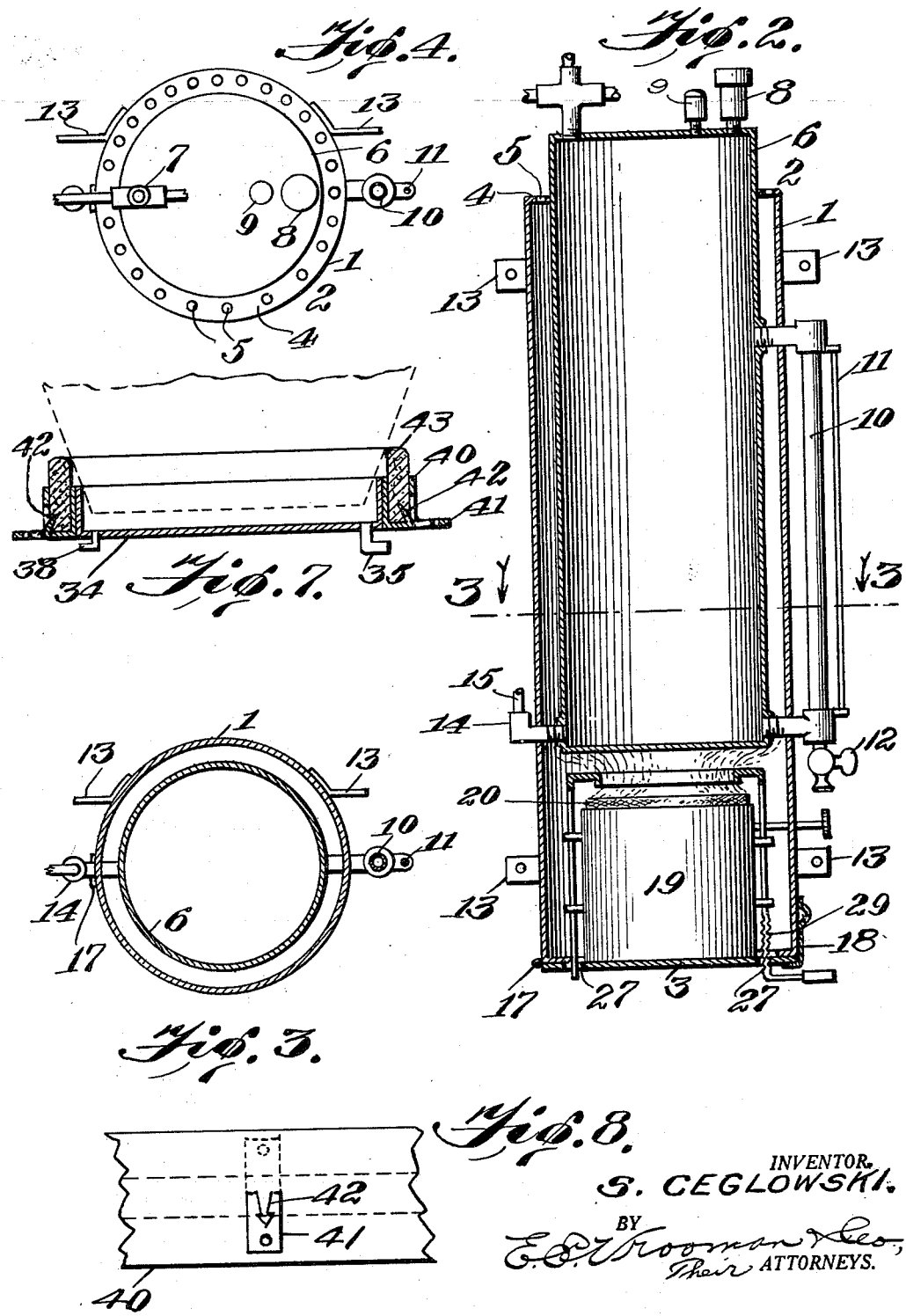
INVENTOR.
S. CEGLOWSKI.
BY
Their ATTORNEYS.

Patented Mar. 25, 1930

1,752,148

UNITED STATES PATENT OFFICE

STEPHAN CEGLOWSKI, OF PORTAL, NORTH DAKOTA

AUTOMOBILE HEATING APPARATUS

Application filed May 2, 1929. Serial No. 359,954.

This invention relates to an automobile heating apparatus.

The object of my invention is the construction of simple and efficient means for heating a unit or units of a motor vehicle, such as the oil pan or crank case of a motor, or the carbureter and the like.

Another object of my invention is the construction of a simple and efficient apparatus, for heating the oil pan or crank case by applying the apparatus directly thereto, and sealing the space between the apparatus and the crank case by a peculiarly constructed cork gasket and the co-operating units thereof.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 2 is a vertical, central sectional view of the heating unit or steam generator of the apparatus.

Figure 3 is a sectional view taken on line 3, 3, Figure 2, and looking in the direction of the arrows.

Figure 4 is a top plan view of the heating unit, shown in Figure 2.

Figure 7 is an enlarged central sectional view of the crank case heating unit, that is applied against the crank case.

Figure 8 is a fragmentary view of the blank from which the outer or auxiliary casing of the crank case heating unit is formed.

Figure 1:
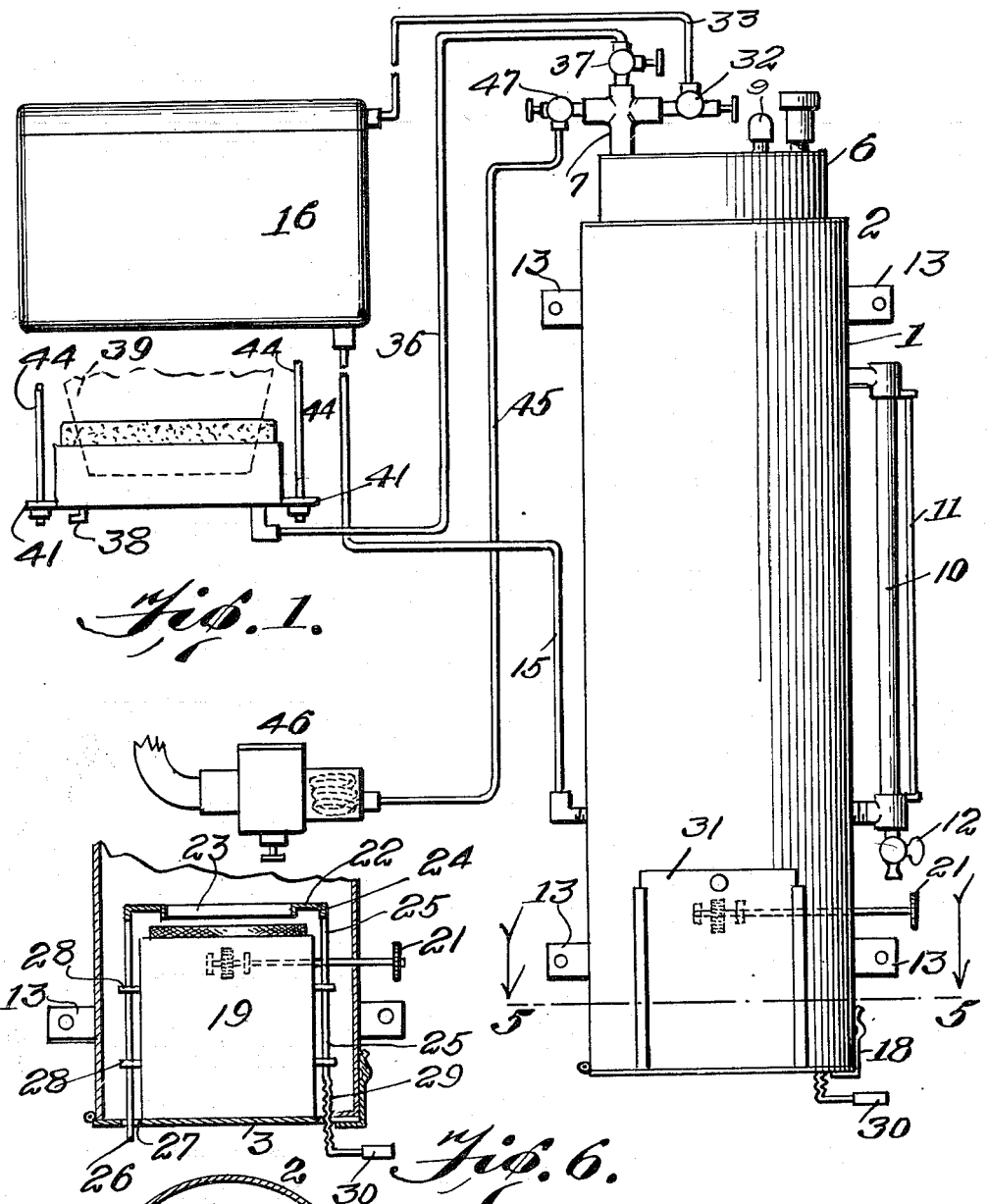
Figure 1 is a view in side elevation of an apparatus constructed in accordance with the present invention.
Figure 6:
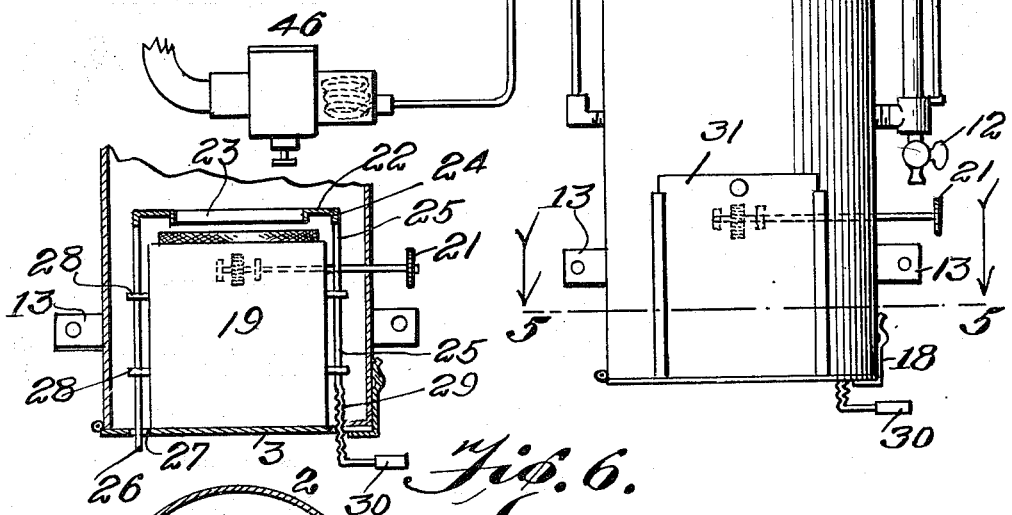
Figure 6 is a fragmentary, sectional view of the lower part of the heating unit, shown in Figure 2.
Figure 5:
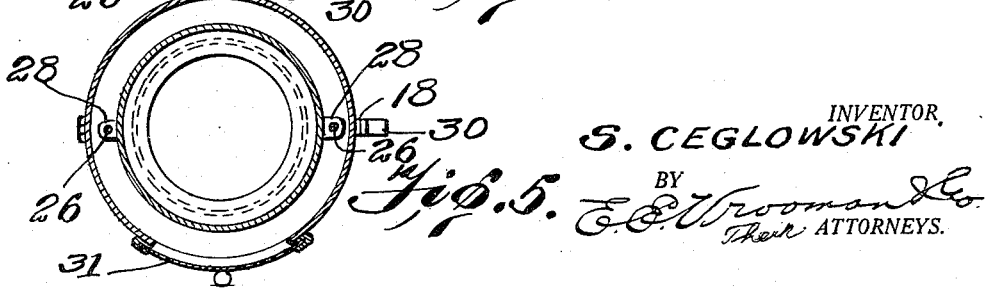
Figure 5 is a sectional view taken on line 5, 5, Figure 1, and looking in the direction of the arrows.

Referring to the drawings by numerals, 1 designates the primary casing of the heating unit or steam generator 2. This casing 1 is provided with a bottom 3 and with a horizontal top 4; in the top 4 are a plurality of ventilating apertures 5. An auxiliary boiler 6 is suspended within the primary casing 1 by being suitably fastened to the horizontal apertured top 4; this boiler 6 projects a slight distance above the top 4, and on this upper projecting portion of boiler 6 is a four-way coupling 7. There is also a cap 8 on the top of boiler 6, which cap can be removed when it is desired to fill the boiler. The coupling 9 may be used for connecting a pipe to the boiler 6. A gage glass 10 is suitably connected to the boiler, which glass is provided with a protecting rod 11. On the lower end of the gage glass 10 is suitably mounted a drain cock 12. The primary casing is provided with brackets 13 whereby the heating unit or steam generator can be attached to the dash or any other suitable part of an automobile. To the lower end of boiler 6 is connected coupling 14 for receiving one end of the return pipe 15, which return pipe is connected to the bottom of the radiator 16, which radiator is preferably for the passenger compartment of an automobile. The bottom 3 of casing 1 is hinged at 17 and is held in a closed position by spring clasp 18.

Steam is generated in the boiler 6 by means of a heating device supported on bottom 3. This heating device comprises a lamp 19 having a round wick 20; this wick is raised or lowered by a suitable manually operated device 21. A flame extinguisher is used, comprising a plate 22 having an annular depending inner flange 23 and an outer depending flange 24. Rods 25 and 26 extend downwardly from flange 24 and through apertures 27 in the hinged bottom 3. These rods 25 and 26 slide in guides 28 fastened on the sides of the lamp 19. The rod 25 is notched at 29, so that the rod can hook on the bottom 3 and thereby hold the lamp extinguisher away from the flame when the lamp is in operation, but by the operator pulling outwardly on horizontal grip 30, the rod can be released from the bottom 3 to allow plate 22 to descend upon the wick and extinguish the flame when desired. A sliding door 31 (Fig. 1) is utilized for examining the lamp, or for lighting the wick.

The heating device or radiator 16 is connected to one side of coupling 7 by a valved device 32 and supply pipe 33. Steam is permitted to pass from boiler 6 through valve device 32 and pipe 33 to radiator 16 and thence steam and liquid may return to the boiler 6 through said pipe 15.

The crank case heating unit or device comprises an oil pan or primary receptacle 34 to the bottom of which is connected an L-shaped coupling 35. A steam supply pipe 36 is connected at its outer end to coupling 35 and at its inner end to valved device 37 fastened to the top of coupling 7. An exhaust coupling 38 is fastened at an opposite part of pan 34 to allow steam or water to escape therefrom, but the steam acts upon the crank case 39 to heat the same in cold or chilly weather. An auxiliary receptacle 40 surrounds the primary receptacle 34 and is provided with outwardly extending apertured tongues 41. This auxiliary casing can be very reasonably manufactured by being stamped by automatic machinery from a blank, with the tongues 41 cut from the blank, reducing the cost of construction; on these tongues 41 are barbed spurs 42 (Fig. 8), which slightly penetrate the cork gasket 43. This cork gasket 43 is forced down into the auxiliary casing 40, with the upper part projecting, to engage the crank case 39 (Fig. 7) and efficiently seal the heating unit, against the crank case, so as to prevent any steam from escaping, except through the exhaust 38. While placing the heating unit in position, it is desirable that the cork gasket be not accidentally displaced from casing 40. Therefore, the simple and efficient barbed spurs 42 will hold the cork gasket nicely in place, without adding to the cost of construction. Suitable rods 44 are fastened to apertured tongues or lugs 41 and are also fastened to the crank case for suspending the crank case heating unit thereon.

A supply pipe 45 is utilized for heating the carbureter 46. This pipe 45 is connected to a valved device 47, which is fastened to the side of the coupling 7.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In an apparatus of the class described, the combination of a primary casing adapted to be placed contiguous to a crank case, an auxiliary casing around said primary casing, a cork gasket in said auxiliary casing and adapted to bear against a crank case, and means on said primary casing whereby steam may be supplied thereto.

2. In an apparatus of the class described, the combination of a primary casing adapted to be placed contiguous to a crank case, an auxiliary casing around said primary casing, said auxiliary casing provided with lug-like tongues and with gasket fastening means, a cork gasket in said auxiliary casing and engaging said fastening means, and steam pipe connecting means on said primary casing.

3. In an apparatus of the class described, the combination of a primary casing, adapted to be placed contiguous to a crank case, an auxiliary casing surrounding and abutting against the outer side or edge of said primary casing, said auxiliary casing being formed from a single blank and provided with stamped apertured tongues and with stamped integral barbed spurs, a cork gasket set down in said auxiliary casing with said barbed spurs extending therein, said cork gasket extending above the upper edge of said auxiliary casing, a supplying coupling fastened to the bottom of said primary casing, and an exhaust outlet coupling fastened to the bottom of said primary casing, substantially as shown and described.

In testimony whereof I hereunto affix my signature.

STEPHAN CEGLOWSKI.